United States Patent [19]

Dubensky

[11] Patent Number: 4,761,019
[45] Date of Patent: Aug. 2, 1988

[54] STEERING KNUCKLE ASSEMBLY

[75] Inventor: Robert G. Dubensky, Dearborn, Mich.

[73] Assignee: Chrysler Motors Corporation, Highland Park, Mich.

[21] Appl. No.: 93,444

[22] Filed: Sep. 4, 1987

[51] Int. Cl.$^4$ .............................................. B62D 7/00
[52] U.S. Cl. ................................... 280/674; 403/114; 280/96.1
[58] Field of Search .............. 280/96.1, 674, 93, 95 R; 180/253; 403/43, 114, 115

[56] References Cited

U.S. PATENT DOCUMENTS

| | | | |
|---|---|---|---|
| 1,201,115 | 10/1916 | VanHorne et al. | 403/43 |
| 3,073,616 | 1/1963 | Stump | 280/95 R |
| 3,495,859 | 2/1970 | Hassan | 280/95 R |
| 3,865,394 | 2/1975 | Epner et al. | 280/96.1 |
| 4,618,159 | 10/1986 | Kozyra et al. | 280/96.1 |
| 4,674,760 | 6/1987 | Goulart | 280/88 |

Primary Examiner—Kenneth R. Rice
Attorney, Agent, or Firm—Edward A. Craig

[57] ABSTRACT

A steering knuckle assembly is provided. The assembly includes a steering knuckle fabricated of unitary sheet metal. The knuckle has three channels. Two of the channels are used for mounting upper and lower control arms by ball joints. The third channel is used for mounting the steering tie rod by a ball joint. The channels for securing the control arms in place are symmetrical about the horizontal axis of the knuckle and the channel for mounting the steering tie rod extends from the midpoint of the steering knuckle so that the steering knuckle is usable as a left hand or right hand steering knuckle by orienting the steering arm channel to point in one direction or the other.

3 Claims, 2 Drawing Sheets

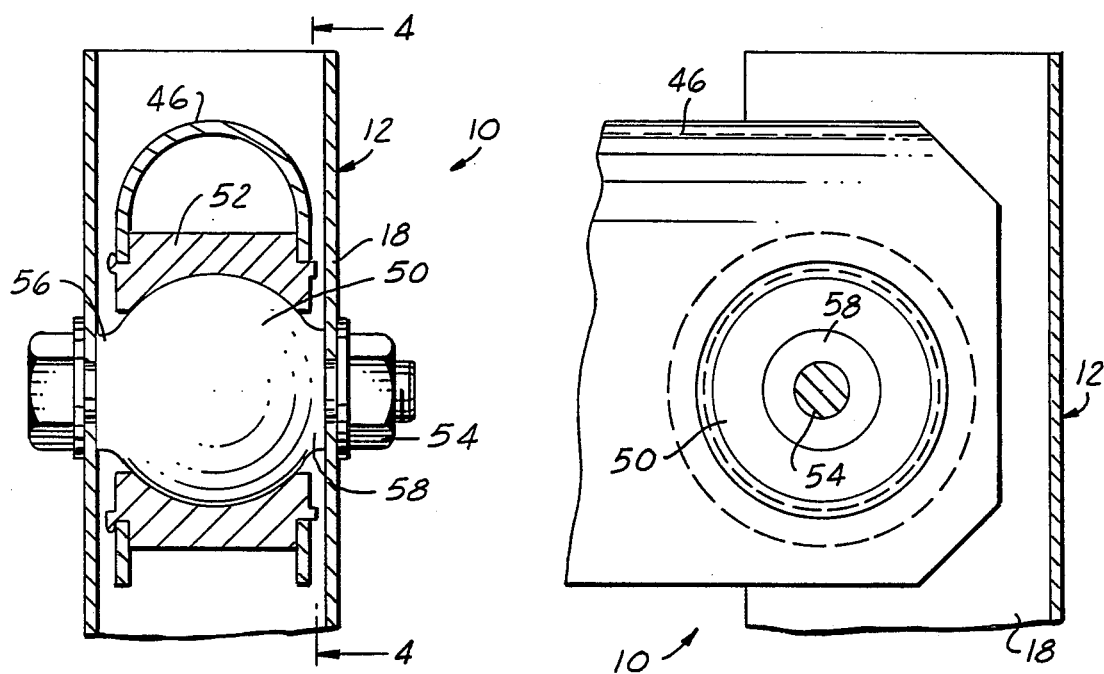
FIG.3
FIG.4
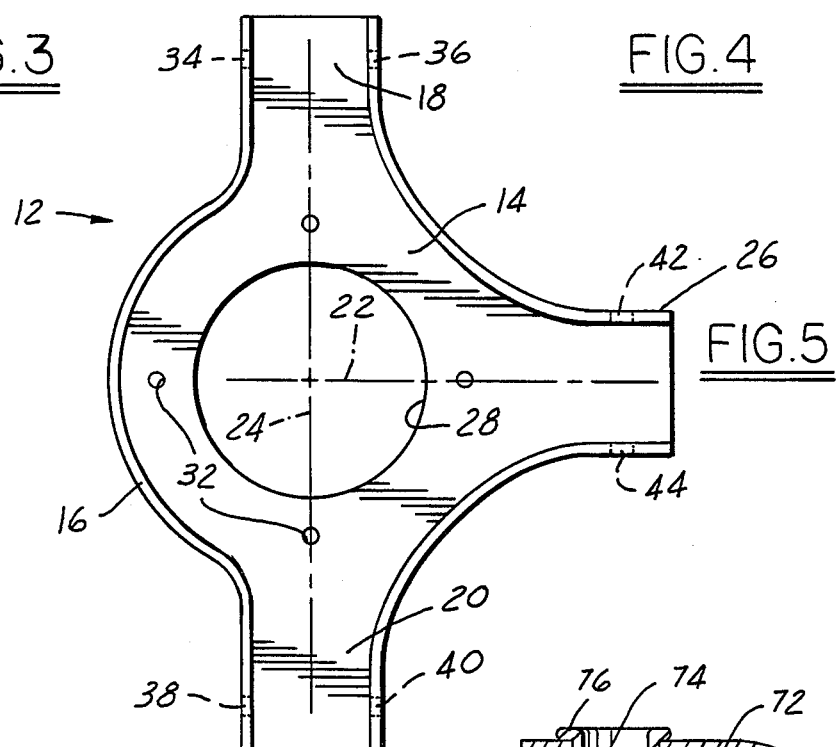
FIG.5
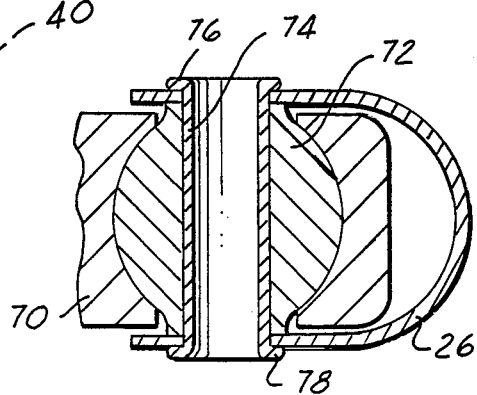
FIG.6

STEERING KNUCKLE ASSEMBLY

BACKGROUND OF THE INVENTION

1. Field of the Invention

This invention relates to a steering knuckle assembly for vehicles which includes a stamped knuckle with ball joints for attachment of the steering tie rod and upper and lower control arms.

2. Prior Art

Conventionally, steering knuckles for vehicles have been fabricated either by casting or forging. This process is relatively expensive and results in a relatively heavy component. Additionally, cast or forged steering knuckles have required subsequent machining which adds to the expense.

It has been suggested in the past that steering knuckles be fabricated from sheet metal as, for example, in U.S. Pat. No. 3,865,394, Epner et al, issued Feb. 11, 1975 and U.S. Pat. No. 4,674,460, Goulart, issued June 23, 1987. While these patents represent an advance in the art in the sense that the steering knuckles are integrally fabricated from sheet metal, they do not solve the problem of attachment of the upper and lower control arms and steering tie rod. Conventionally, steering knuckles which are fabricated by casting or forging are attachable to the control arms and steering tie rod by means of bearing constructions which are formed integrally with the thicker material of the cast or forged units. Sheet metal is relatively thin and is not capable of being formed into the desired conventional bearing structures.

In order to overcome this problem, the present invention provides a channel structure capable of mounting ball joint structures for attachment of the desired elements. The use of all joints in steering mechanisms has been suggested in the past, as for example, in U.S. Pat. No. 1,201,115, Van Horne et al, issued Oct. 10, 1916. However, this patent does not suggest use of ball joints in connection with a sheet metal steering knuckle construction. The present invention also provides a steering knuckle construction which is universal in that it may be used either in a left hand steering knuckle assembly or a right hand steering knuckle assembly without alteration.

SUMMARY OF THE INVENTION

The steering knuckle assembly includes a steering knuckle comprising a unitary sheet metal, generally cup-shaped member having a bottom wall and a substantially continuous side wall structure extending outwardly in one direction from the bottom wall. A pair of generally vertically extending cup-shaped oppositely disposed control arm channels are defined by the bottom wall and side wall structure. The control arm channels are symmetrical about the horizontal axis of the steering knuckle. A generally cup-shaped horizontally extending steering arm channel extends from the mid-point of the steering knuckle. The steering knuckle is usable as a left hand or right hand knuckle by orienting the steering arm channel to point in one direction or the other.

A ball joint is mounted in each of the control arm channels and the steering arm channel. Upper and lower control arms are connected to the ball joints in the control arm channels. A steering tie rod is connected to the ball joint in the steering arm channel. The ball joints serve as structural reinforcement for the channels.

Preferably, the channels exert an axially compressive force against the ball joints. The ball joints are preferably of the double shear type.

BRIEF DESCRIPTION OF THE DRAWINGS

FIG. 3 is a sectional view taken substantially along the line 3—3 of FIG. 3 looking in the direction of the arrows;

FIG. 4 is a sectional view taken substantially along the line 4—4 of FIG. 3 looking in the direction of the arrows;

FIG. 5 is a plan view of the steering knuckle illustrated in FIG. 1; and

FIG. 6 is a sectional view similar to FIG. 2 illustrating an alternate method for securing a ball joint into the steerubg knuckle steering arm.

DETAILED DESCRIPTION OF THE PREFERRED EMBODIMENT

Figure 1:
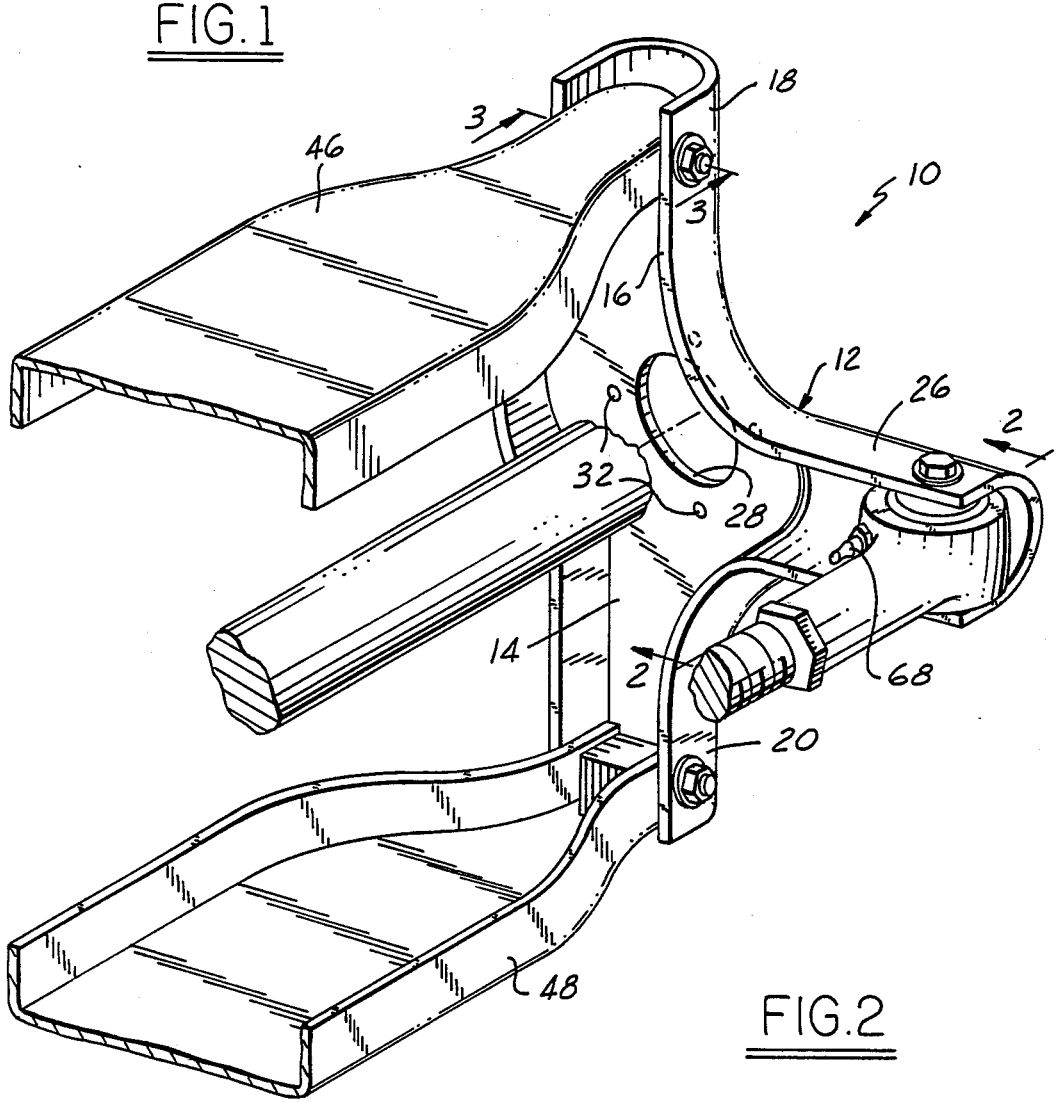
FIG. 1 is a view in perspective of one embodiment of the steering knuckle assembly of the present invention.

As will be noted in the figures, the steering knuckle assembly 10 includes a steering knuckle 12. The steering knuckle 12 is a unitary sheet metal, generally cup-shaped member. The knuckle 12 has a bottom wall 14 from which extends a substantially continuous side wall structure 16. The side wall structure 16 extends outwardly in one direction from the bottom wall 14.

A pair of generally vertically extending and cup-shaped oppositely disposed control arm channels 18, 20 are defined by the bottom wall 14 and side wall structure 16. The control arm channels 18, 20 are symmetrical about the horizontal axis 22 of the steering knuckle. The control arm channels 18, 20 may be strictly vertical as shown or may be tilted to the left or to the right as viewed in FIG. 5. However, if they are angled to the right or to the left they must both be angled in the same direction at the same degree in order to maintain the desired symmetry. The control arm channels 18, 20 do not have to be located on the vertical axis 24 of the steering knuckle but may be moved laterally to the left or to the right as desired for a particular construction. The key thing is that the control arm channels be symmetrical about the horizontal axis 22 so that the steering knuckle may be used in a right hand or left hand assembly of a vehicle.

A generally cup-shaped horizontally extending steering arm channel 26 extends from the mid-point of the steering knuckle, that is, along the horizontal axis 22. Again, it is necessary that this arrangement be provided for the steering arm channel 26 in order that the steering knuckle is usable as a left hand or right hand steering knuckle. This may be accomplished by orienting the steering arm channel 26 to point in one direction or the other as desired for a left hand or right hand steering knuckle. If the channel 26 were located above or below the mid-point of the steering knuckle, then when a desired orientation occurred, the two steering knuckles used would not be the same, one would have the steering arm channel higher than the steering arm channel of the other.

A central opening 28 is provided to accommodate a driven or non-driven axle 30. An opening 28 of various sizes or shapes may be provided to accommodate the desired axle configuration. Smaller openings 32 are provided around the opening 28 for attachment of brakes, anchors and the like.

Oppositely disposed openings 34, 36, 38, 40, 42, 44 are provided in the channel side walls for reception of fastening means to hold ball joint structures in place as will be noted in FIG. 5.

Figure 2:
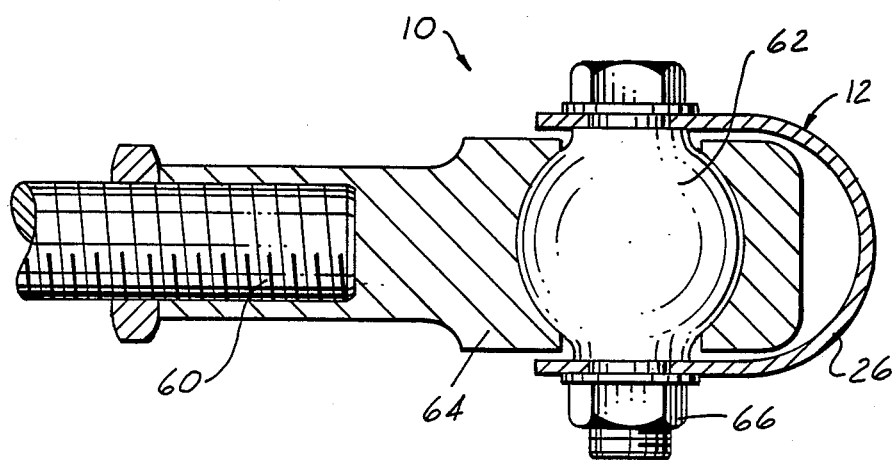
FIG. 2 is a sectional view taken substantially along the line 2—2 of FIG. 1 looking in the direction of the arrows.

Upper and lower control arms 46, 48 are secured to the control arm channels 18, 20 by means of ball joint structure as may be best seen in FIG. 3. The ball joint structure comprises a ball form 50 which is received in a socket 52 which is preferably provided with a bearing liner. This structure is held in place by means of a nut and bolt structure 54. As will be noted, the ball form 50 has side portions 56, 58 which bear against the channel side walls, and with the nut and bolt structure 54 being preloaded, a compressive force, having a desired spring rate is applied against the ball joints in an axial direction. The ball joint has a controllable axial spring rate to preload axially in compression. This can be done with tapered members or rings or alternate materials. This is true for all of the ball joints in the assembly. The ball joints are preferably of the double shear ball type. As will be noted in FIGS. 2 and 3, the ball joints permit movement around the ball forms as well as to some degree in an up and down direction. The up and down direction can be modified as desired by providing more clearance.

The ball joint for the tie rod 60 is substantially similar to that above described including a ball form 62 and lined socket 64. This construction is held in place by means of a nut and bolt structure 66. Preferably a tapered bolt is used. Additionally, a grease fitting 68 is provided to lubricate the ball joint as is best shown in FIG. 1. The axially compressive spring rate force is also preferably provided for the ball joint and channel assembly.

The ball joints as above described serve as structural reinforcement for the channels and thus provide a secure and durable steering knuckle assembly.

FIG. 6 illustrates an alternate fastener for the ball joints. As will be noted, the socket 70 and ball form 72 are provided as above described. Instead of a nut and bolt construction, this ball joint is held in place by means of a hollow rivet 74 which is up-ended at both ends 76, 78. During the up-ending process, the desired compressive force may be applied.

I claim:

1. A steering knuckle assembly including a steering knuckle comprising a unitary sheet metal, generally cup-shaped member having a bottom wall, substantially continuous side wall structure extending outwardly in one direction from the bottom wall, a pair of generally vertically extending cup-shaped oppositely disposed control arm channels defined by the bottom wall and side wall structure, the control arm channels being symmetrical about the horizontal axis of the steering knuckle, a generally cup-shaped horizontally extending steering arm channel extending from the mid-point of the steering knuckle, the steering knuckle being usable as a left hand or right hand steering knuckle by orienting the steering arm channel to point in one direction or the other, a ball joint mounted in each of the control arm channels and steering arm channel, upper and lower control arms connected to the ball joints in the control arm channels, and a steering tie rod connected to the ball joint in the steering arm channel, the ball joints serving as structural reinforcement for the channels.

2. A steering knuckle assembly as defined in claim 1, further characterized in that the channels exert an axial compressive force against the ball joints.

3. A steering knuckle assembly as defined in claim 1, further characterized in that the ball joints are of the double shear type.

* * * * *